July 26, 1960  J. K. MOSHER  2,946,605
IN-FLIGHT AIRCRAFT REFUELING APPARATUS
Filed March 22, 1956  3 Sheets-Sheet 1

INVENTOR.
JAMES K. MOSHER
BY
*Attorney*

July 26, 1960  J. K. MOSHER  2,946,605
IN-FLIGHT AIRCRAFT REFUELING APPARATUS
Filed March 22, 1956  3 Sheets-Sheet 2

INVENTOR.
JAMES K. MOSHER
BY
Attorney

July 26, 1960   J. K. MOSHER   2,946,605
IN-FLIGHT AIRCRAFT REFUELING APPARATUS
Filed March 22, 1956   3 Sheets-Sheet 3

INVENTOR.
JAMES K. MOSHER
BY
Attorney

United States Patent Office 2,946,605
Patented July 26, 1960

2,946,605

IN-FLIGHT AIRCRAFT REFUELING APPARATUS

James K. Mosher, Pasadena, Calif., assignor to Schulz Tool and Manufacturing Co., San Gabriel, Calif., a corporation of California Filed Mar. 22, 1956, Ser. No. 573,206

11 Claims. (Cl. 284—18)

This invention relates to apparatus or mechanism for performing in-flight refueling of aircraft from one plane to another, that is, from a tanker plane to the plane to be refueled. The invention forms a part of a system wherein a tubular connection is lowered from the tanker plane, and with which connections are made with a forwardly extending tubular conduit member extending from the plane to be refueled. The conduit extending from the tanker plane carries at its end a fitting called a drogue, with which fluid-tight connections are made by a fitting called a probe, at the end of the conduit member extending forwardly from the plane to be refueled. The connection between the drogue and the probe is made in mid air and is a universal connection to accommodate relative movements of the planes in flight.

This invention involves particularly an improved drogue and probe, and improvements in the manner of achieving the fluid-tight connection therebetween. The drogue includes a ball and socket fitting or coupling and it embodies a poppet valve which is opened upon interconnection of the probe and drogue. The drogue and probe are arranged to provide an interconnecting sealing fit at the time the poppet valve opens, to provide for flow of fluid through the coupling without leakage. The invention involves still more particularly automatic mechanism for latching the drogue and probe together when connection has been made, and particularly the latching is automatic in response to the pressure of fluid being transferred. The latching is hydraulic and is particularly novel in that it provides for variable adjustment of the latching force in response to the fluid pressure, and thus the drogue and probe can be latched together to provide a desired degree of resistance to uncoupling in mid air. The force which is required to break the coupling is quite critical inasmuch as it is not desired that the coupling should come apart in response to air bumps and the like, and still it is necessary that it be possible for the coupling to be broken in an emergency. The present invention satisfies these objectives in a highly satisfactory manner.

A primary object of the present invention is to provide an improved drogue and probe combination for in-flight refueling systems.

Another object of the invention is to provide an improved drogue and probe wherein the drogue has a poppet valve therein which is unseated by the probe by way of a sleeve forming part of the probe which seats against the drogue to complete the fluid-tight coupling.

Another object is to provide an arrangement as in the foregoing object wherein the sleeve is latched against retraction until coupling of the parts is achieved.

Another object of the invention is to provide a drogue and probe assembly as in the foregoing object, wherein an automatic latch is provided to releasably latch the drogue and probe together after they have been coupled.

Another object of the invention is to provide an hydraulic latch as in the foregoing object, wherein the latch is automatically responsive to fluid pressure when the coupling is made and is in the form of a toggle link mechanism operable to releasably engage the drogue with the probe.

Numerous other objects and additional advantages of the invention will become apparent from the following detailed description and annexed drawings, wherein:

Fig. 3 is a view partly in cross section of the probe;

Figure 1:
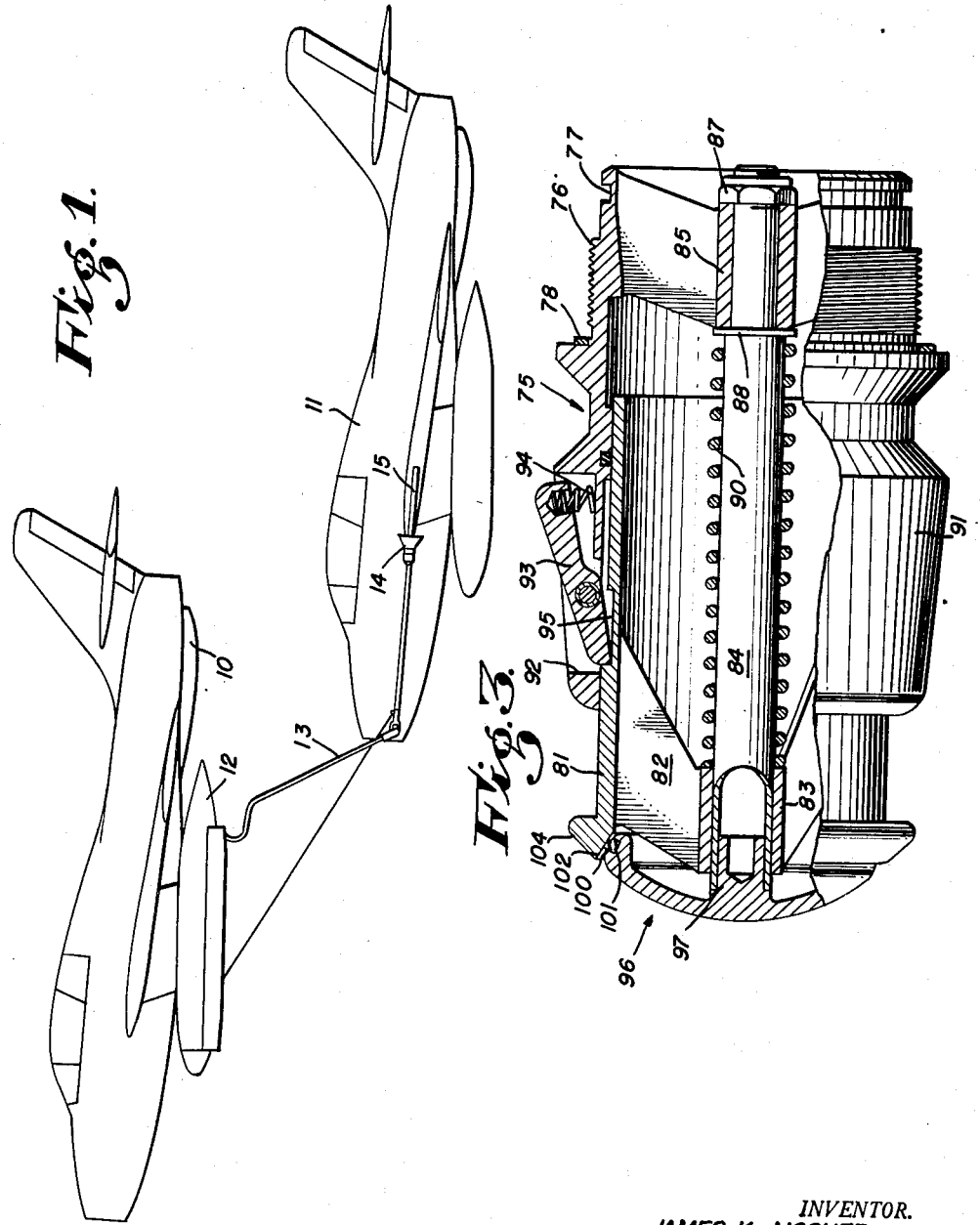
Fig. 1 is a schematic view of aircraft with a refueling system in coupled relationship.

Referring to Fig. 1 of the drawings, this figure shows a tanker aircraft 10 and a plane to be refueled 11. The tanker 10 has a fuel tank 12 from which there is shown depending an articulated fuel delivery conduit 13 having at its end a drogue 14 which may be that of this invention. The plane 11 has a forwardly extending conduit 15 at the forward end of which is a probe which may be the probe of this invention fitting within the drogue 14.

Figure 2:
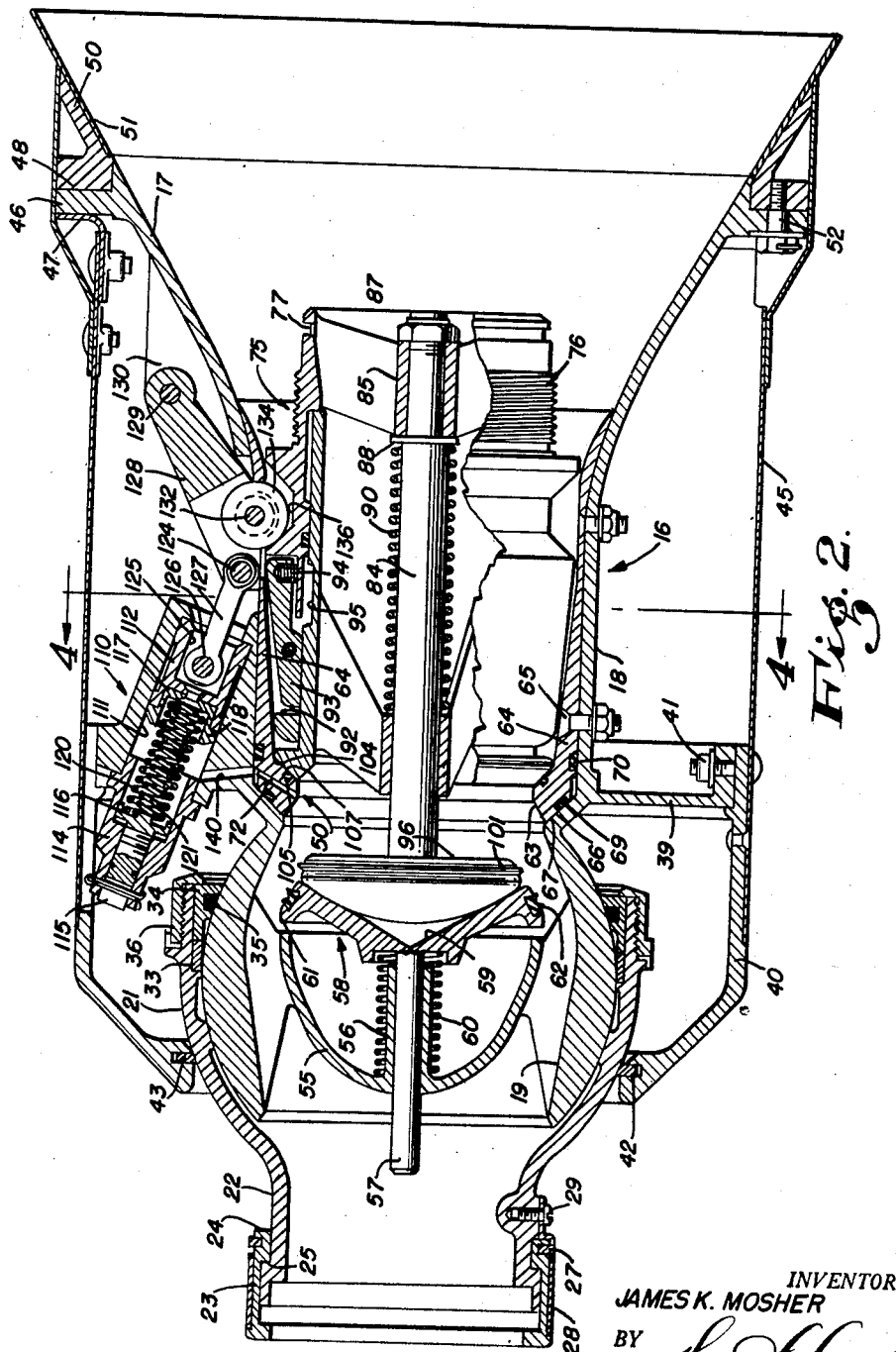
Fig. 2 is a cross-sectional view of the drogue and probe of this invention in assembled relationship with the coupling made and the poppet valve open.
Figure 4:
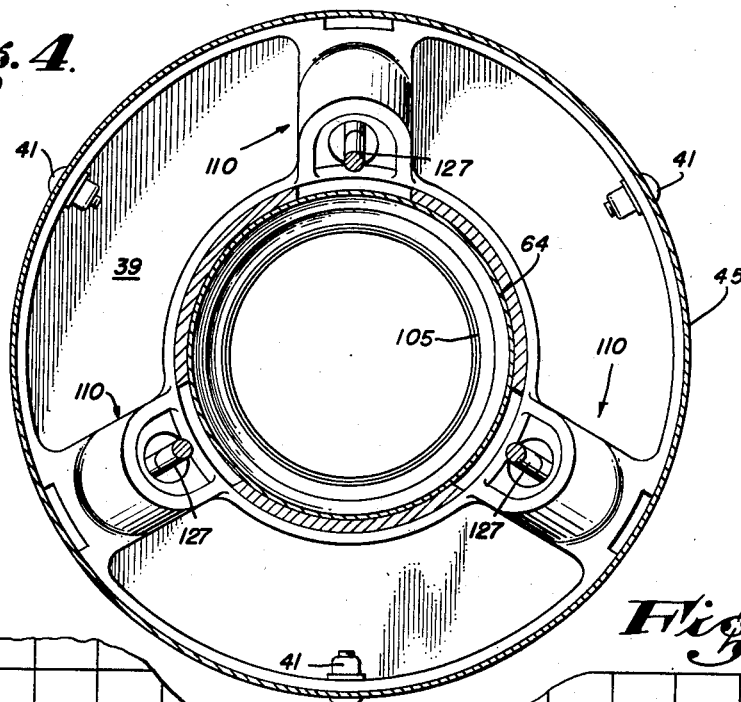
Fig. 4 is a sectional view taken along line 4—4 of Fig. 2.

Referring now more particularly to Fig. 2 of the drawings, the drogue includes a member generally designated at 16 which includes a conical or bell-shaped portion 17, an intermediate cylindrical portion 18 and a generally spherical portion 19 at its left end. The spherical portion 19 forms part of a ball and socket joint, the socket member being designated by the numeral 21, and being generally hemispherical in shape. The socket member 21 is cylindrical at its left end, as shown at 22, and carries a ring-shaped coupling member 23 having an annular rib 24 engaging an annular shoulder 25 in the portion 22 as shown. The coupling is held on by a snap ring 27 and a retainer ring 28, fastened by a lock screw 29. The coupling 23 adapts the socket member for connection to the articulated conduit assembly, extending downwardly from the tanker plane.

The inner end of the socket 21 is cylindrical as shown, and within it carries a Teflon sealing ring 33, and a seal ring 34 having the cross sectional shape as shown, the ring 34 having an annular groove carrying a sealing strip or ring 35 which engages the ball 19. The sealing assembly is held in position by a locking ring 36, engaging the cylindrical portion of socket 21 in screw-threaded relationship. The connection between the socket 21 and ball 19 provides for universal movement of the part 16 of the drogue relative to the socket and coupling.

The portion 18 of the member 16 has outwardly extending webs as shown at 39, to which is attached a circular member 40 by bolts as shown at 41. The left end of the member 40 is tapered as shown, and it has an annular groove as shown at 42, carrying a ring-shaped scraper member 43 which engages the exterior of the socket 21. A cylindrical shell 45 is attached to the member 40 as shown, around the cone or bell-shaped portion 17 of the drogue. The portion 17 has an extending flange 46 to which the shell 45 is secured by brackets as shown at 47. Numeral 48 designates a ring-shaped member engaging the flange 46 and having a flared extension 50, against the inner surface of which is a cone-shaped member 51, the inner surface of which is flush with the interior of the cone-shaped member 17. Member 48 is attached to flange 46 by bolts as shown at 52.

Within the ball 19 there is formed a generally hemispherical web 55 which has a central longitudinal guide member 56 within which is received the stem 57 of a poppet valve 58. The poppet valve 58 operates against a coiled biasing spring 60. The poppet valve 58 is conical in shape, having an inner conical face 59, and has slanting seating faces as shown at 61, which carry a sealing ring 62 which is adapted to seat against a seat 63 formed on the end of a cylindrical member 64 which is within the intermediate portion of the drogue. The cylindrical member 64 is attached by bolts as shown at 65, and it has a slanting face at its left end as shown at 66, which engages a slanted circular face 67 within portion 18 of the drogue, this face having an annular groove with a sealing ring 69 in it. The member 64 is also sealed by way of a sealing ring 70 in an annular groove in the side of the circular member 64 as shown. Formed as shown in the end of the cylindrical member 64 is a port as shown at 72, which communicates with the face 67, and the purpose of which will be described presently.

The drogue includes hydraulic latching mechanism operable to releasably latch the probe in position. Before the hydraulic latch mechanism is described however, the details of the probe will be described. The probe itself is shown in detail in Fig. 3. The probe is shown in Fig. 2 in coupled position with the poppet valve 58 opened.

Referring more particularly to Fig. 3, the probe comprises a generally cylindrical housing member 75 having a screw threaded portion 76 with annular groove 77 and shoulder 78, adapting it for connection to the tubular member extending from the plane to be refueled. Numeral 81 designates a sleeve which is slidable within the housing 75 and which has a web 82 attaching it to a central guide 83 slidable on a stem 84 mounted in a cylindrical fitting 85 within the housing 75. The fitting 85 is adjustable by a nut 87. The stem 84 has a flange 88, and between this flange and the guide 83 is a coiled biasing spring 90 against which the sleeve 81 operates when it moves inwardly.

The housing 75 is flared outwardly at 91 and has slotted portions as shown at 92, in each of which is pivoted a latch member 93 biased by a spring 94 as shown. The forward end of the latch engages in an annular groove 95 in sleeve 81 and prevents retraction of sleeve 81 until the latch is released by coupling of the drogue and probe as will be described. Thus the seal at the end of the probe is not broken by frictional engagement within the drogue until full coupling is achieved.

The stem 84 carries at its end a valve operator or pusher 96 having a rounded face as shown. It has an integral cylindrical central portion 97 which engages the stem 84 as shown. The valve operator 96 has a slanting edge face 100 as shown, carrying a sealing ring 101 which is adapted to engage the internal slanting face 102 at the end of the sleeve 81 as shown. The sealing ring 101 normally provides a seal between the valve operator and the end of the sleeve 81. As can be observed, the member 96 and sleeve 81 form a valve at the end of the probe.

Referring again to Fig. 2 of the drawings, the probe in this figure is in coupled relationship with the drogue. The probe has been extended into the drogue by the plane being refueled with the valve operator 96 engaging the conical face 59 of the poppet valve 58 so that the valve is open as shown. The slanting face 104 at the end of the sleeve 81 has an engaged sealing ring 105 in a cooperating slanting face 107 within the cylindrical member 64, so that a seal is provided between this member and the sleeve 81. The sleeve 81 has been retracted within the housing 75 against the spring 90. The drogue and probe are thus assembled and coupled for flow of fuel from the tanker plane to the plane being refueled. The coupling comprises a universal joint as described, formed by the ball and socket, so that the joint accommodates itself to relative movement of the planes in mid air without interfering with the sealed connection formed by the coupling.

With the parts as shown in Fig. 2, latch 93 has engaged with the interior of cylinder 64 which is tapered so as to lift the nose of the latch out of groove 95 against spring 94. Thus sleeve 81 has been unlatched, allowing it to be retracted.

It is important that the coupling does not break apart as a result of jars or air bumps which are encountered in flight, particularly at high speed and in rough weather. It is necessary that the drogue and probe be held together with a certain breaking force. On the other hand, this breaking force must not be too high since it must always be possible for the coupling to be separated in an emergency. My invention provides for releasably and automatically hydraulically latching the drogue and probe together so as to provide for a wide range of adjustment in latching force so that the assembly can be adapted to any circumstances and requirements.

The drogue 16 has a group of three extending bosses as shown at 110, adapted to receive hydraulic actuators as will be described. The boss 110 has a cylindrical bore 111 in which is received a piston 112. One end of the bore 111 is closed by a plug 114 having a screw fitting 115 for adjusting a spring retainer 116. The end of the piston 112 has a cylindrical recess 117 in which is a spring retainer fitting 118, and between it and the spring retainer 116 are coiled compression spring 120 and 121. The piston 112 has an internal bore 125, and pivoted therein on a pivot 126 is a toggle link 127. The toggle link 127 is pivoted on pivot 124 between the legs of a bifurcated link 128 pivoted on a pivot 129, carried by a bracket 130 extending from the portion 17 of drogue 16. Pivoted on a pivot 132 extending between the bifurcations of the link 128 is a roller 134. The toggle links 127 and 128 form a knee which is adapted to be flexed to urge the roller 134 into a channel 136 formed in the side of the housing 75.

The boss 110 has a port 140 therein, which communicates with the bore 111 and the previously described port 72. Through these ports fluid pressure is admitted to the hydraulic cylinder when the valve operator 96 unseats from the seat 63. Thus it will be observed that whenever the sealing rings 101 of operator 96 unseat, fuel pressure is admitted to the hydraulic cylinder urging the piston 112 outwardly to flex the toggle joint and to urge the roller 134 into the channel 136. (As previously described, there are three of the hydraulic toggle mechanisms equally spaced angularly around the circumference of the housing 75.) Thus it will be seen that a latching force is applied to latch the probe and drogue together with a desired breaking resistance, dependent upon the fuel pressure and conveniently adjustable by adjusting the hydraulic cylinder. Thus the mechanism is very effective for its purpose and is very adaptable to a wide range of requirements whereby a desired latching force can be provided to depend upon fuel pressure and upon the circumstances of the particular application.

Figure 5:
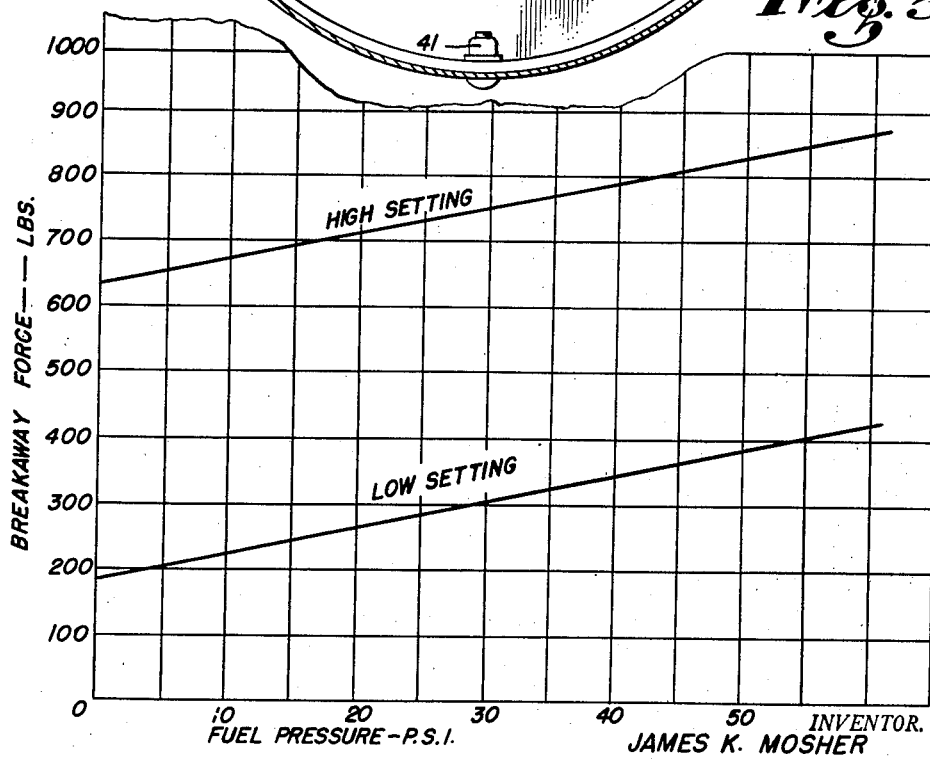
Fig. 5 is a graph illustrating break-away force as between the drogue and probe relative to fuel pressure.

Fig. 5 of the drawings is a diagrammatic illustration of the characteristics of the hydraulic latching device as respects breaking force relative to fuel pressure. The diagram in this figure shows a characteristic for two settings of the hydraulic cylinder. From the diagram it is apparent that any desired characteristic as to break-away force relative to fuel pressure can be provided by the design and adjustment of the hydraulic cylinder.

From the foregoing those skilled in the art will observe that I have provided an extremely novel, original and effective probe and drogue assembly operable to be automatically coupled in mid air and to provide an effective sealed coupling for transferring fuel from a tanker plane to a plane to be refueled. The assembly is safe and efficient and is particularly novel and effective in view of the releasable hydraulic latching mechanism which is able to provide automatically any desired latching break-away force suitable to the fuel pressures available and the attendant circumstances. By reason of the latch for the retractable sleeve the probe cannot become unsealed during coupling maneuvering of the aircraft. The foregoing disclosure is intended to be illustrative rather than limiting upon the invention. Various modifications and alternatives may be adopted by those skilled in the art, all of which it is intended should fall within the realm and scope of the claims appended hereto.

I claim:

1. In an inflight refueling system for transfer of fluid between aircraft in flight of the type having a drogue and a probe adapted to be coupled to the drogue, the drogue and probe having valve means formed therein adapted to open upon the parts being brought into coupling relationship to provide for sealed flow of fluid through the coupling formed; the improvement comprising cooperating yieldable latching means carried by the probe and drogue adapted to latch them together when brought into coupling relationship, said latching means comprising a fluid operated piston and means providing communication of operating fluid to the piston when the parts are brought into coupling relationship, said communicating means providing for communication with the interior of the coupling whereby the force required to uncouple depends upon the pressure of the fluid transmitted to the latching means.

2. The structure of claim 1 wherein the valve means in the drogue has a seat with a port formed in the seat and said communicating means communicates with the said piston connects to said port.

3. In a probe unit adapted to cooperate with a drogue, in an inflight aircraft refueling system, in combination: means comprising a cylindrical member having a retractible sleeve member cooperating therewith adapted to form a valve seat; a valve member adapted to cooperate with the sleeve; means normally urging the sleeve member in a direction to cause it to seat with the valve member, the sleeve member being adapted to be retracted upon the probe being brought into engagement with a drogue with the valve member of the probe extending inwardly into the drogue; and latch means carried by the probe and engageable with means on said sleeve member to latch the sleeve member against retraction until the probe has been brought into operative relationship with a drogue, said latch means comprising a member positioned externally of the sleeve member to be engageable with a drogue whereby to effect unlatching upon the probe reaching a predetermined position within the drogue.

4. In a flexible coupling of the type comprising parts including a socket having a valve therein; and a probe adapted to be received in the socket, the probe having a valve formed therein, one of said parts having a retractible member and the other part having a seat adapted to be engaged by the retractible member to provide for sealed flow of fluid through the assembly when the parts are brought into coupling relationship, the valves in both parts opening upon retraction of the retractible member, the improvement comprising: means forming a yieldable, hydraulic latching mechanism providing cooperative engagement between the said parts when they are in coupling relationship, the said mechanism providing a yielding holding force between the parts, the magnitude of which is dependent upon the hydraulic pressure in the mechanism.

5. The structure of claim 4 wherein said latchnig mechanism comprises a hydraulic cylinder and means providing communication between said cylinder and the interior of the coupling.

6. The structure of claim 5 wherein said communicating means includes a port formed in the seat portion of the valve in the socket, whereby fluid is admitted to the hydraulic cylinder when the valve in the socket is unseated.

7. The structure of claim 4 including a latching device carried by the probe and cooperating with said retractible member and arranged to normally latch the retractible member against retraction, said latching device having a portion positioned to effect unlatching upon said probe having attained a predetermined degree of insertion into said socket.

8. In a flexible coupling of the type comprising parts including a socket having a valve therein; and a probe adapted to be received in the socket, the probe having a valve formed therein, one of said parts having a retractible member and the other part having a seat adapted to be engaged by the retractible member to provide for sealed flow of fluid through the assembly when the parts are brought into coupling relationship, the valves in both parts opening upon retraction of the retractible member, the improvement comprising: means forming a yieldable, hydraulic, latching mechanism providing cooperation engagement between the said parts when they are in coupling relationship, the said mechanism providing a yielding holding force between the parts, the magnitude of which is dependent upon the hydraulic pressure in the mechanism, and latch means carried by the probe and engageable with means on said retractible member to latch said retractible member against retraction, said latch means having a part positioned on the outside of said retractible member whereby to effect unlatching upon attainment of a predetermined position of the probe within the socket wherein the latch means is actuated by engagement with the socket.

9. In a flexible coupling of the type comprising parts including a socket having a valve therein; and a probe adapted to be received in the socket, the probe having a valve formed therein, one of said parts having a rectactible member and the other part having a seat adapted to be engaged by the retractible member to provide for sealed flow of fluid through the assembly when the parts are brought into coupling relationship, said retractible member forming a part of one of said valves whereby to open said one valve when the retractible member is retracted, the valve in the socket being opened upon insertion of the probe into the socket, the improvement comprising: latch means carried by the probe and engageable with means on said retractible member to latch said retractible member against retraction, said latch means having a part positioned on the outside of said probe whereby to effect unlatching of the retractible member upon attainment of a predetermined position of the probe within the socket wherein the latch means is actuated by engagement with the socket.

10. In a probe terminal assembly for insertion into a drogue, an outer sleeve for connection with a probe, said outer sleeve having an opening from its exterior to its interior, a valve head spaced from the front end of said outer sleeve, means within said outer sleeve and connecting said valve head and outer sleeve for unitary movement, a valve sleeve slidable in said outer sleeve and projecting forwardly therefrom, said valve sleeve having a seat abutting said valve head and also having a valve surface spaced radially outward from said seat to abut a seat of the drogue, said valve sleeve being provided with an external rearwardly facing shoulder exposed at the aforesaid opening, spring means acting forwardly on said valve sleeve and reacting rearwardly on said outer sleeve to normally hold said seat of said valve sleeve against said valve head, and latch means mounted in said opening and normally engaging said shoulder of said valve sleeve to positively lock said seat of said valve against said valve head, said latch means having a releasing portion projecting beyond the outer periphery of said outer sleeve for actuation by a portion of the drogue to release said latch means as the probe terminal assembly enters the drogue.

11. A structure as specified in claim 10; said latch means comprising a lever disposed longitudinally of said outer sleeve and pivoted between its ends for movement radially of said outer sleeve, and a spring yieldably holding said lever in a normal position in which its front end abuts said shoulder, the rear end of said lever constituting the aforesaid latch releasing portion.

References Cited in the file of this patent

UNITED STATES PATENTS

| 2,634,927 | Smith et al. | Apr. 14, 1953 |
| 2,728,590 | MacGregor | Dec. 27, 1955 |

FOREIGN PATENTS

| 152,622 | Australia | July 31, 1953 |